United States Patent
Shahparnia et al.

(10) Patent No.: US 10,558,302 B2
(45) Date of Patent: Feb. 11, 2020

(54) CODED INTEGRATION OF A SELF-CAPACITANCE ARRAY

(71) Applicant: Apple Inc., Cupertino, CA (US)

(72) Inventors: Shahrooz Shahparnia, Campbell, CA (US); Marduke Yousefpor, San Jose, CA (US)

(73) Assignee: Apple Inc., Cupertino, CA (US)

( * ) Notice: Subject to any disclaimer, the term of this patent is extended or adjusted under 35 U.S.C. 154(b) by 904 days.

(21) Appl. No.: 14/286,949

(22) Filed: May 23, 2014

(65) Prior Publication Data
US 2015/0338952 A1 Nov. 26, 2015

(51) Int. Cl.
*G06F 3/044* (2006.01)

(52) U.S. Cl.
CPC ................ *G06F 3/044* (2013.01)

(58) Field of Classification Search
CPC ............. G06F 3/044; G06F 3/0418; G06F 2203/04112
See application file for complete search history.

(56) References Cited

U.S. PATENT DOCUMENTS

| | | |
|---|---|---|
| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |

(Continued)

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Sahlu Okebato
(74) *Attorney, Agent, or Firm* — Kubota & Basol LLP

(57) ABSTRACT

Coded integration of a self-capacitance array to improve signal-to-noise ratio (SNR) of self-capacitance measurements is disclosed. A composite measurement of the self-capacitance of a plurality of electrodes can be measured for a plurality of integration periods. The composite measurements can include weighted contributions of charge from the plurality of electrodes, the weighting corresponding to a code. In some examples, the weighted contribution can include positive contributions integrated by a first integrator circuit and negative contributions integrated by a second integrator circuit. The composite measurements of the self-capacitance for the plurality of integration periods can be decoded to extract the self-capacitance measurement for the electrodes. The SNR for the self-capacitance measurements can therefore be improved by increasing the number of samples during the total integration period without requiring dedicated sensing circuitry for the electrodes.

32 Claims, 12 Drawing Sheets

(56) References Cited

U.S. PATENT DOCUMENTS

| | | |
|---|---|---|
| 7,015,894 B2 | 3/2006 | Morohoshi |
| 7,184,064 B2 | 2/2007 | Zimmerman et al. |
| 7,663,607 B2 | 2/2010 | Hotelling et al. |
| 8,479,122 B2 | 7/2013 | Hotelling et al. |
| 8,547,359 B2 | 10/2013 | Souchkov |
| 8,982,091 B1 | 3/2015 | Mohindra |
| 2006/0197753 A1 | 9/2006 | Hotelling |
| 2010/0060591 A1 | 3/2010 | Yousefpor et al. |
| 2010/0060593 A1 | 3/2010 | Krah |
| 2011/0261006 A1 | 10/2011 | Joharapurkar et al. |
| 2012/0056841 A1 | 3/2012 | Krenik |
| 2012/0086656 A1 | 4/2012 | Hung et al. |
| 2012/0105325 A1 | 5/2012 | Brosnan et al. |
| 2013/0050130 A1 | 2/2013 | Brown |
| 2014/0145997 A1* | 5/2014 | Tiruvuru ............... G06F 3/0416 345/174 |
| 2014/0347122 A1* | 11/2014 | Hong ....................... H03D 3/00 329/315 |
| 2015/0091845 A1* | 4/2015 | Park ........................ G06F 3/044 345/174 |
| 2015/0109212 A1 | 4/2015 | Yao et al. |
| 2015/0109213 A1 | 4/2015 | Yao et al. |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Final Office Action dated May 9, 2016, for U.S. Appl. No. 14/059,411, filed Oct. 21, 2013, 13 pages.

Non-Final Office Action dated Mar. 28, 2016, for U.S. Appl. No. 14/059,427, filed Oct. 21, 2013, eight pages.

Final Office Action dated Oct. 8, 2015, for U.S. Appl. No. 14/059,427, filed Oct. 21, 2013, 13 pages.

Non-Final Office Action dated Mar. 3, 2015, for U.S. Appl. No. 14/059,427, filed Oct. 21, 2013, 12 pages.

Non-Final Office Action dated Sep. 25, 2015, for U.S. Appl. No. 14/059,411, filed Oct. 21, 2013, 13 pages.

\* cited by examiner

CODED INTEGRATION OF A SELF-CAPACITANCE ARRAY

FIELD OF THE DISCLOSURE

This relates to touch sensor panels used as input devices for computing systems, and more particularly, to coded integration of a self-capacitance touch sensor panel.

BACKGROUND OF THE DISCLOSURE

Touch sensitive devices have become popular as input devices to computing systems due to their ease and versatility of operation as well as their declining price. A touch sensitive device can include a touch sensor panel, which can be a clear panel with a touch sensitive surface, and a display device, such as a liquid crystal display (LCD), that can be positioned partially or fully behind the panel or integrated with the panel so that the touch sensitive surface can cover at least a portion of the viewable area of the display device. The touch sensitive device can allow a user to perform various functions by touching the touch sensor panel using a finger, stylus, or other object at a location often dictated by a user interface (UI) being displayed by the display device. In general, the touch sensitive device can recognize a touch event and the position of the touch event on the touch sensor panel, and the computing system can then interpret the touch event in accordance with the display appearing at the time of the touch event, and thereafter can perform one or more actions based on the touch event.

As touch sensing technology continues to improve, touch sensitive devices can be designed with improved signal-to-noise ratio (SNR) for improved performance in detecting touch signals. Increasing the SNR for the touch sensitive device, however, can require additional hardware that can increase the power consumption and size of capacitive sensing circuitry.

BRIEF SUMMARY OF THE DISCLOSURE

This relates to coded integration of a self-capacitance array to improve the signal-to-noise ratio (SNR) of self-capacitance measurements. A composite measurement of the self-capacitance of a plurality of electrodes can be measured for a plurality of integration periods. The composite measurements can include weighted contributions of charge from the plurality of electrodes, the weighting corresponding to a code. In some examples, the weighted contribution can include positive contributions integrated by a first integrator circuit and negative contributions integrated by a second integrator circuit. The composite measurements of the self-capacitance for the plurality of integration periods can be decoded to extract the self-capacitance measurement for the electrodes. The SNR for the self-capacitance measurements can be improved by increasing the number of samples during the total integration period without requiring dedicated sensing circuitry for the electrodes.

DETAILED DESCRIPTION OF THE DISCLOSURE

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to coded integration of a self-capacitance array to improve the signal-to-noise ratio (SNR) of self-capacitance measurements. A composite measurement of the self-capacitance of a plurality of electrodes can be measured for a plurality of integration periods. The composite measurements can include weighted contributions of charge from the plurality of electrodes, the weighting corresponding to a code. In some examples, the weighted contribution can include positive contributions integrated by a first integrator circuit and negative contributions integrated by a second integrator circuit. The composite measurements of the self-capacitance for the plurality of integration periods can be decoded to extract the self-capacitance measurement for the electrodes. The SNR for the self-capacitance measurements can be improved by increasing the number of samples during the total integration period without requiring dedicated sensing circuitry for the electrodes.

Figure 1:
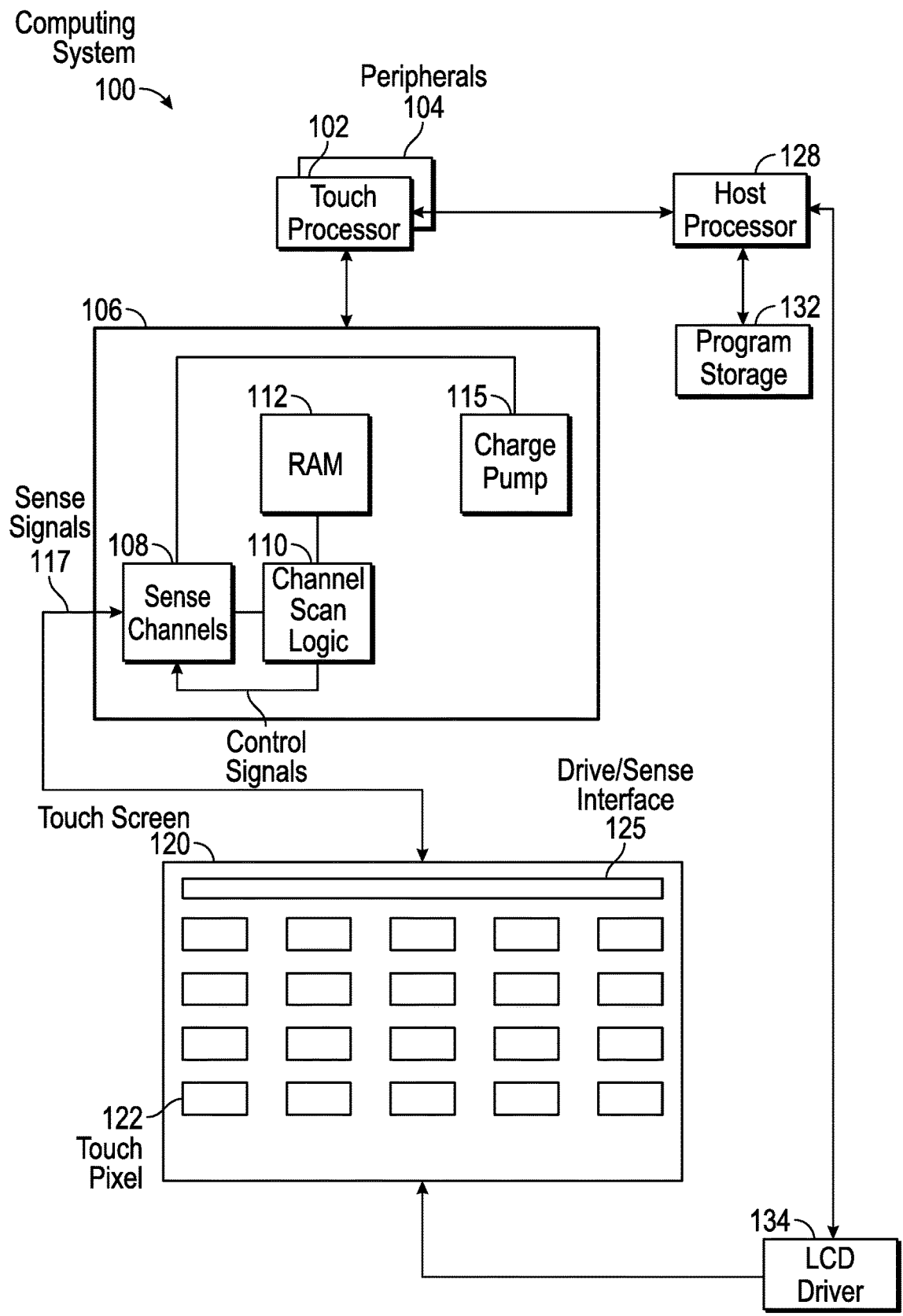
FIG. 1 illustrates an exemplary computing system capable of implementing coded integration of a self-capacitance array according to examples of the disclosure.

FIG. 1 illustrates an exemplary computing system capable of implementing coded integration of a self-capacitance array according to examples of the disclosure. Computing system 100 can be included in, for example, mobile telephone 936, digital media player 940, personal computer 944, tablet computer 948, or any mobile or non-mobile computing device that includes a touch screen, including a wearable device. Computing system 100 can include a touch sensing system including one or more touch processors 102, peripherals 104, a touch controller 106 that can execute software or firmware implementing the algorithm for coded integration of a self-capacitance array, and touch sensing circuitry (described in more detail below). Peripherals 104 can include, but are not limited to, random access memory (RAM) or other types of memory or storage, watchdog timers and the like. Touch controller 106 can include, but is not limited to, one or more sense channels 108, and channel scan logic (analog or digital) 110. Channel scan logic 110 can access RAM 112, autonomously read data from sense channels 108 and provide control for the sense channels 108. In addition, channel scan logic 110 can control sense channels 108 to generate stimulation signals at various phases that can be selectively applied to the touch pixels 122 of touch screen 120, as described in more detail below. In some examples, touch controller 106, touch processor 102 and peripherals 104 can be integrated into a single application specific integrated circuit (ASIC), and in some examples can be integrated with touch screen 120 itself.

Touch screen 120 can be a self-capacitance touch screen, and can include touch a capacitive sensing medium having a plurality of electrodes. In some examples, the plurality of electrodes can include a matrix of small plates of conductive material that can be referred to as touch pixels 122 or touch pixel electrodes. For example, touch screen 120 can include a plurality of touch pixels 122, each touch pixel corresponding to a particular location on the touch screen at which touch or proximity (i.e., a touch or proximity event) can be sensed. A touch screen using touch pixels 122 can be referred to as a pixelated self-capacitance touch screen. During operation, a touch pixel can be stimulated and the self-capacitance of the touch pixel with respect to ground can be measured. As an object approaches the touch pixel, the self-capacitance of the touch pixel can change. This change in the self-capacitance of the touch pixel can be detected and measured by the touch sensing system to determine the positions of one or more objects touching or proximate to the touch screen. Touch pixels 122 can be formed as a matrix of substantially transparent conductive plates made of materials such as Indium Tin Oxide (ITO) or Antimony Tin Oxide (ATO), although other transparent and non-transparent materials such as copper can also be used. Some touch screens can be formed by partially integrating touch sensing circuitry and touch pixels into a display pixel stack-up (i.e., the stacked material layers forming the display pixels).

Touch pixels 122 can be coupled to sense channels 108 in touch controller 106. Touch pixels 122 can be driven by stimulation signals from the sense channels through drive/sense interface 125, and can be sensed by the sense channels through the drive/sense interface as well, as described above. Labeling the conductive plates used to detect touch (i.e., touch pixels 122) as "touch pixels" can be particularly useful when touch screen 120 is viewed as capturing an "image" of touch. In other words, after touch controller 106 has determined an amount of touch detected at each touch pixel 122 in touch screen 120, the pattern of touch pixels in the touch screen at which a touch occurred can be thought of as an "image" of touch (e.g., a pattern of fingers touching the touch screen).

Figure 3:
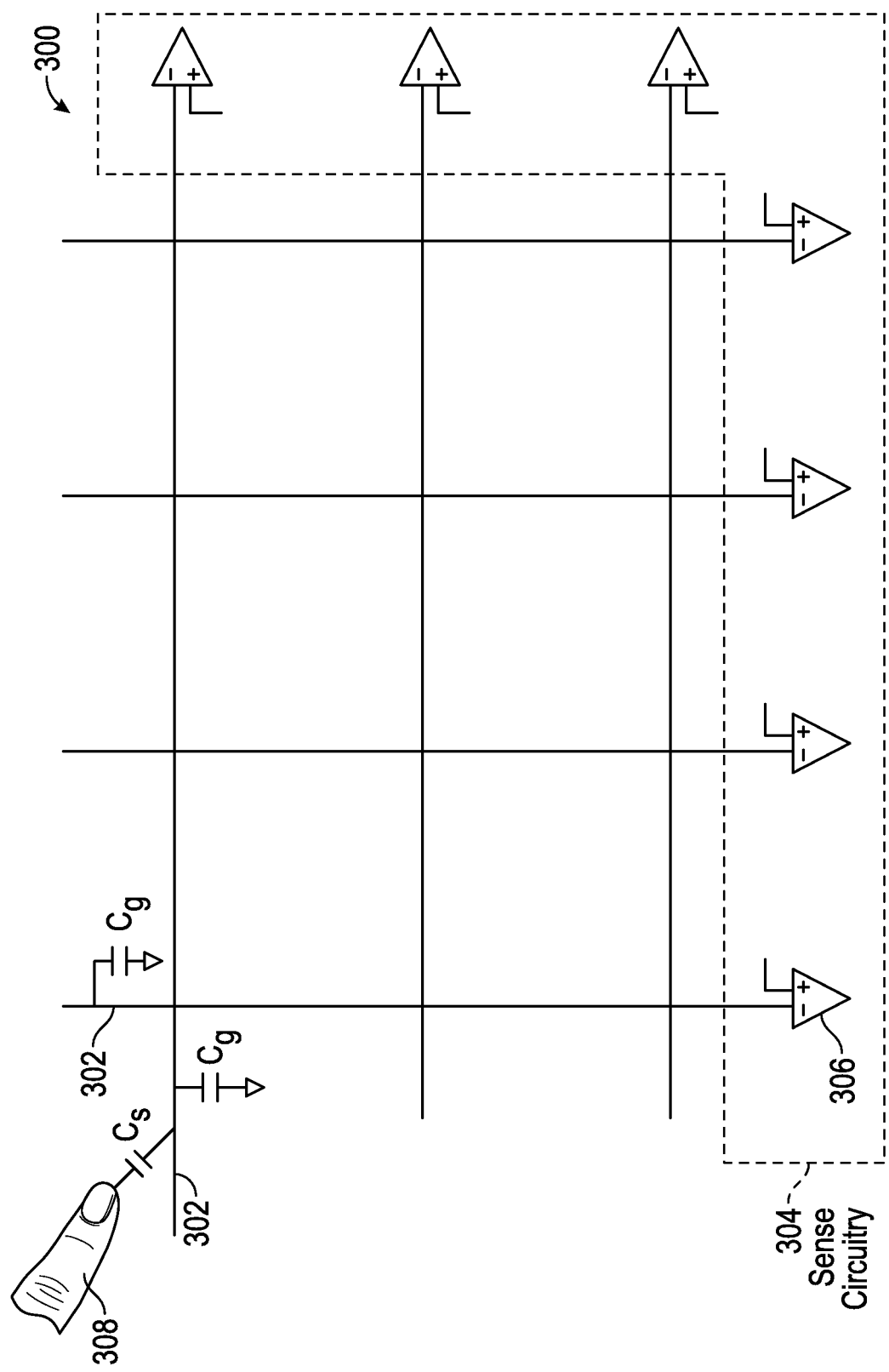
FIG. 3 illustrates an exemplary electrical circuit corresponding to a self-capacitance touch sensor electrode and corresponding sensing circuitry according to examples of the disclosure.

It is understood that while touch screen 120 is described herein as including touch pixels 122, the touch screen can additionally or alternatively include rows and columns of conductive material as described below with reference to FIG. 3; the operation of a touch screen using row and column electrodes can be similar to the that of a touch screen using touch pixel electrodes. Additionally, it is understood that in some examples, touch screen 120 can also be configured as a mutual capacitance touch screen, though the description that follows will assume that the touch screen is a self-capacitance touch screen having a plurality of touch pixel electrodes.

Computing system 100 can also include host processor 128 for receiving outputs from touch processor 102 and performing actions based on the outputs. For example, host processor 128 can be connected to program storage 132 and a display controller, such as an LCD driver 134. The LCD driver 134 can provide voltages on select (gate) lines to each pixel transistor and can provide data signals along data lines to these same transistors to control the pixel display image as described in more detail below. Host processor 128 can use LCD driver 134 to generate an image on touch screen 120, such as an image of a user interface (UI), and can use touch processor 102 and touch controller 106 to detect a touch on or near touch screen 120.

The touch input can be used by computer programs stored in program storage 132 to perform actions that can include, but are not limited to, moving one or more objects such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 can execute software or firmware implementing the algorithm for coded integration of a self-capacitance array according to examples of the disclosure. Host processor 128 can also perform additional functions that may not be related to touch processing.

Note that one or more of the functions described above, including the configuration of switches, can be performed by firmware stored in memory (e.g. one of the peripherals 104 in FIG. 1) and executed by touch processor 102, or stored in program storage 132 and executed by host processor 128. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 2:
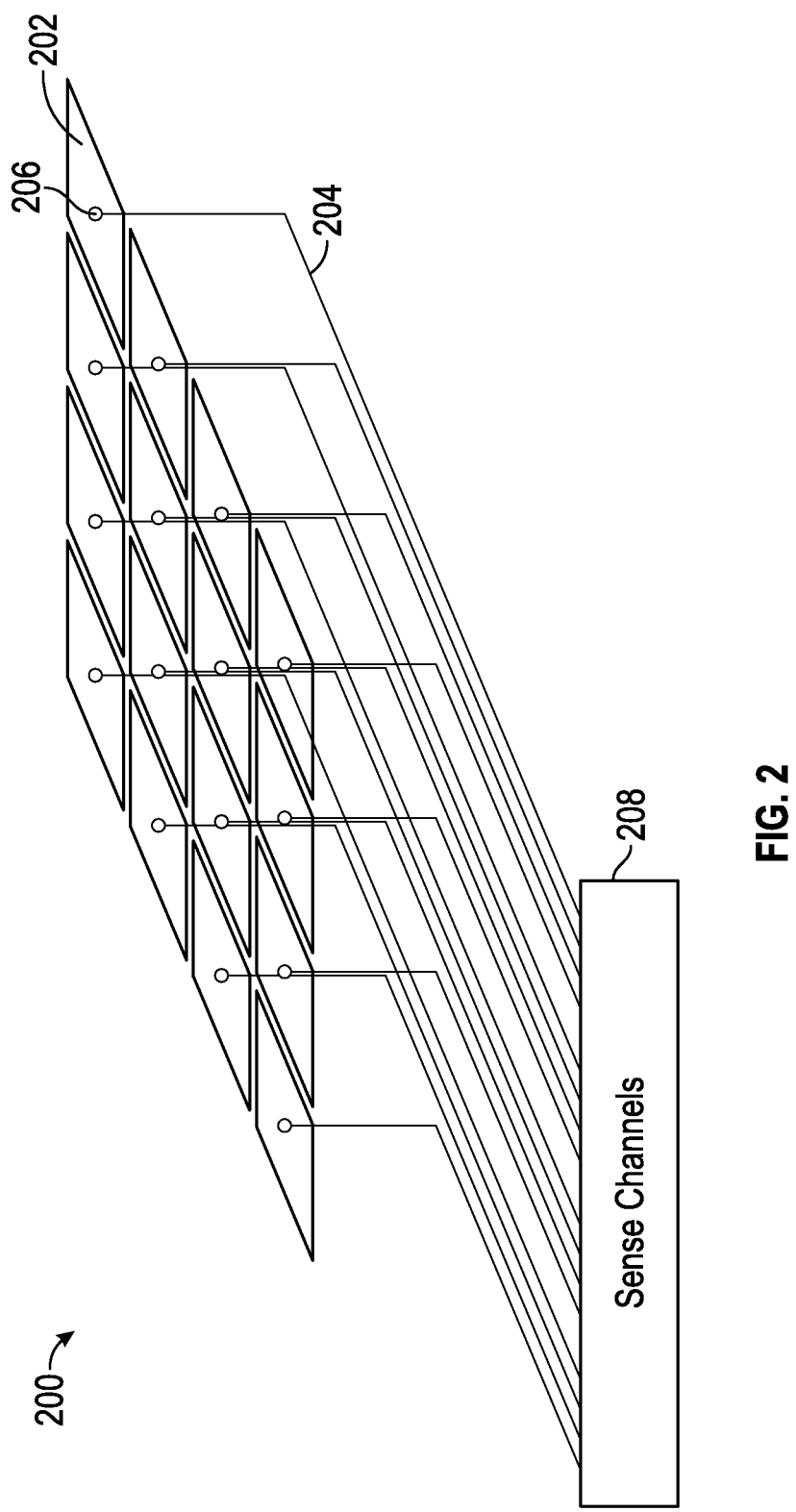
FIG. 2 illustrates an exemplary self-capacitance touch sensor circuit according to examples of the disclosure.

FIG. 2 illustrates an exemplary configuration for electrically connecting touch pixels 202 in touch screen 200 to sense channels 208 according to examples of the disclosure. In some examples, sense channels 208 can be located in a touch controller separate from the touch screen as illustrated in FIG. 1, but in other examples, the sense channels can be part of the touch screen. Touch screen 200 can include touch pixels 202, as described above. Components of touch screen 200 other than touch pixels 202 are not illustrated for ease of description. Each of touch pixels 202 can be electrically connected to sense channels 208 through sense connections 204 and connection points 206. In some examples, sense connections 204 can connect touch pixels 202 to a location on the touch screen (e.g., a flex circuit connection area) from which a separate connection (e.g., a flex circuit) can complete the connection to sense channels 208 (e.g., when the sense channels are separate from touch screen 200). In some examples, sense connections 204 can connect touch pixels 202 directly to sense channels 208 (e.g., when the sense channels are part of touch screen 200). In some examples, connection points 206 can be vias when sense connections 204 and touch pixels 202 reside in different layers of touch screen 200 (e.g., when the sense connections reside underneath the touch pixels, or when the sense connections reside on top of the touch pixels); it is understood, however, that in some examples, the sense connections and the touch pixels can reside in the same layer of the touch screen, and the connection points can represent a location where the sense connections and the touch pixels connect. As discussed above, in some examples, connection points 206 can allow for an electrical connection between touch pixels 202 and sense connections 204 through one or more intervening layers that may exist between the touch pixels and the sense connections in touch screen 200.

Although illustrated in FIGS. 1 and 2 as a pixelated self-capacitance touch screen, in some examples, the electrodes of a self-capacitance based touch system can be formed from rows and columns of conductive material. FIG. 3 illustrates an exemplary self-capacitance touch sensor circuit using row and column electrodes according to examples of the disclosure. Self-capacitive touch sensor circuit 300 can include electrodes 302 arranged in rows and columns to form a touch sensor panel, although other arrangements or patterns are possible. Each electrode 302 can have a self-capacitance to ground and can be connected to sensing circuitry 304, which can be located within the sense channels. Sensing circuitry 304 can include sense amplifiers 306 described in more detail below. When an object, such as finger 308, touches or is in close proximity to an electrode 302, an additional capacitance can be formed between the electrode 302 and ground through the object, which can change the self-capacitance of the electrode. This change in the self-capacitance of electrode 302 can be detected by sensing circuitry 304. Self-capacitance measurements of row and column electrodes can be used to generate an image of touch.

Figure 4A:
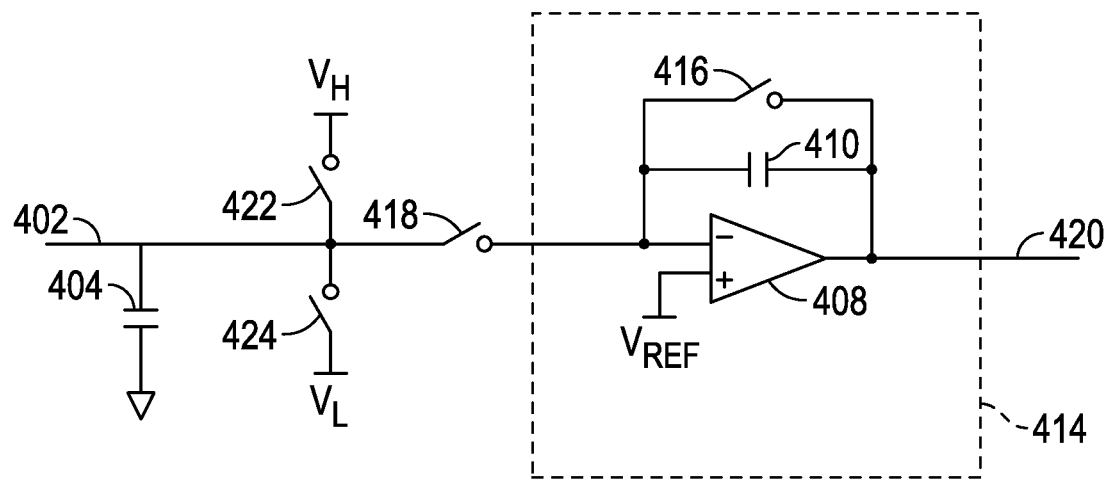
FIG. 4A illustrates an exemplary electrical circuit corresponding to a self-capacitance touch sensor electrode and corresponding discrete sensing circuitry according to examples of the disclosure.

In some examples, discrete self-capacitance circuits can be used to measure self-capacitance using a series of phases. FIG. 4A illustrates an exemplary electrical circuit corresponding to a self-capacitance touch sensor electrode and corresponding discrete sensing circuitry according to examples of the disclosure. Electrode 402 can have an associated self-capacitance 404 with respect to ground. Electrode 402 can be coupled to sensing circuitry 414. Sensing circuitry 414 can include an operational amplifier 408, feedback capacitor 410 and switch 416, although other configurations can be used. The electrode 402 can be coupled to the inverting input of operational amplifier 408 via switch 418. The non-inverting input of operational amplifier 408 can be coupled to a reference voltage such that the operational amplifier 408 can be in a virtual ground configuration. The electrical circuit can also include switches 422 and 424 to couple electrode 402 to voltages $V_H$ (e.g., an analog voltage that can be higher than the reference voltage $V_{ref}$) and $V_L$ (e.g., an analog voltage that can be lower than the reference voltage $V_{ref}$) respectively.

Figure 4B:
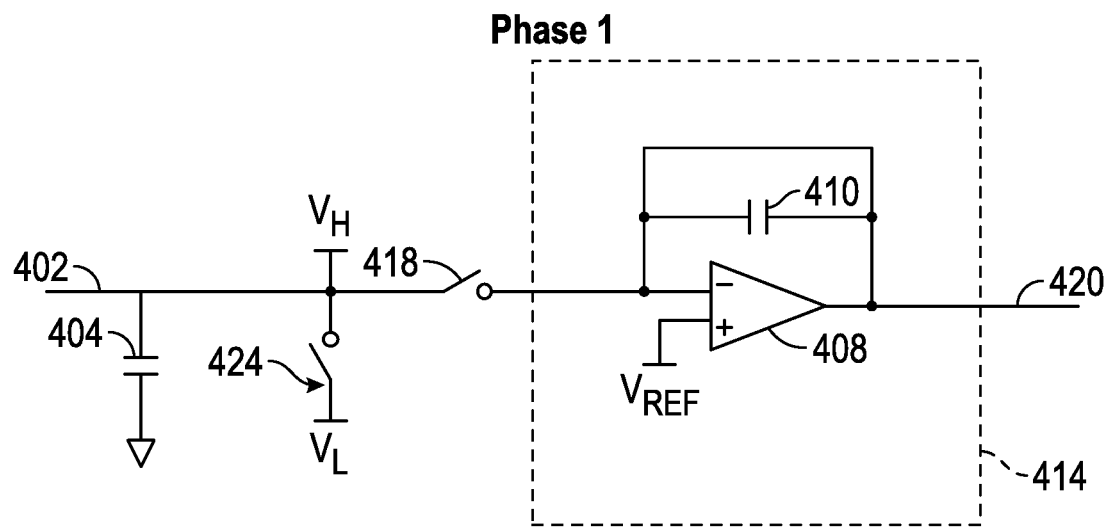
FIGS. 4B-4D illustrate exemplary configurations of an electrical circuit for measuring self-capacitance during various phases of operation according to examples of the disclosure.
Figure 4C:
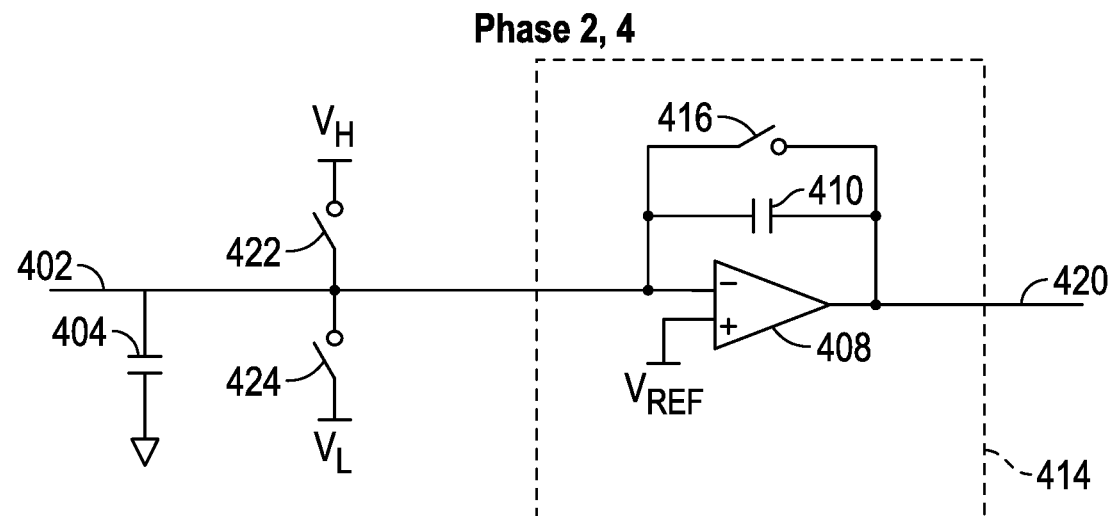
Figure 4D:
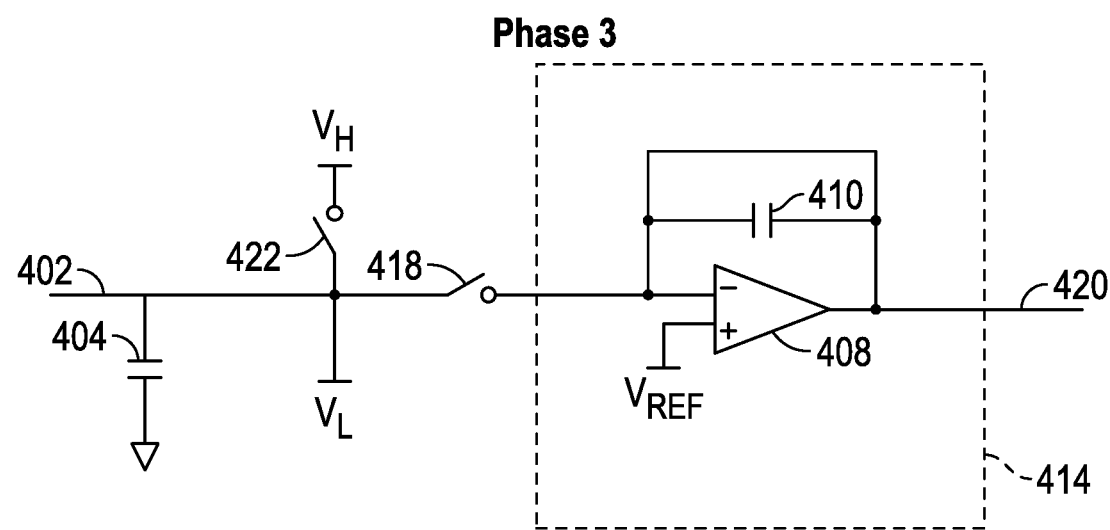

The electrical circuit, including touch sensing circuitry 414, can be configured to sense changes in self-capacitance 304 induced by a finger or object either touching or proximate to the touch sensor panel. FIGS. 4B-4D illustrate exemplary configurations of an electrical circuit for measuring self-capacitance during various phases of operation according to examples of the disclosure. For example, during a first phase, illustrated in FIG. 4B, switches 418 and 424 can be open and switches 416 and 422 (not shown) can be closed. Closing switch 422 can charge up electrode 402 (and thereby charge self-capacitance 404 of the electrode 402) to voltage reference $V_H$ and closing switch 416 can discharge feedback capacitor 410. During a second phase, illustrated in FIG. 4C, switches 416, 422 and 424 can be open and switch 418 (not shown) can be closed. Closing switch 418 can couple electrode 402 to the inverting input of operational amplifier 408 and can allow charge from the electrode 402 to be discharged onto the feedback capacitor 410. The output 420 of operational amplifier 408 can be proportional to the self-capacitance 404 and the voltage of the electrode 402, or in mathematical terms, $V_{o2} \propto C \cdot V_H$, where $V_{o2}$ can represent the output 420 of operational amplifier 408 during the second phase, C can represent the self-capacitance of electrode 402 and $V_H$ can represent the voltage reference during the second phase. The output of the second phase can be stored digitally using an analog to digital converter (not-shown). During a third phase, illustrated in FIG. 4D, switches 418 and 422 can be open and switches 416 and 424 (not shown) can be closed. Closing switch 424 can charge up electrode 402 (and thereby charge self-capacitance 404) to voltage reference $V_L$ and closing switch 416 can discharge feedback capacitor 410. During a fourth phase, illustrated in FIG. 4C, switches 416, 422 and 424 can be open and switch 418 (not shown) can be closed. Closing switch 418 can couple electrode 402 to the inverting input of operational amplifier 408 and can allow charge from the electrode 402 to be discharged onto the feedback capacitor 410. The output 420 of operational amplifier 408 can be proportional to the self-capacitance 404 and the voltage of the electrode 402, or in mathematical terms, $V_{o4} \propto C \cdot V_L$, where $V_{o4}$ can represent the output 420 of operational amplifier 408 during the fourth phase, C can represent the self-capacitance of electrode 402 and $V_L$ can represent the voltage reference during the fourth phase. The output of the fourth phase can be stored digitally using an analog to digital converter (not-shown). The self-capacitance of electrode can be determined based on the difference between the output during the fourth phase and the second phase. For example, in mathematical terms, $V_{o4}-V_{o2} \propto C(V_H-V_L)$, and thus $C \propto (V_{o4}-V_{o2})/(V_H-V_L)$. Measuring the self-capacitance of electrode 402 using voltage references $V_H$ and $V_L$ (i.e., correlated double sampling) can improve noise immunity of the self-capacitance measurement. For example, assuming there can also be charge at the output 420 of operational amplifier 408 due to noise at the input during the second and fourth phases, by subtracting the output of the fourth phase from the output of the second phase, the circuit can subtract out some or all correlated noise in the circuit.

Although the described phases sample and integrate self-capacitance using voltage reference $V_H$ first and then using voltage reference $V_L$, in other examples, self-capacitance can be sampled and integrated using voltage reference $V_L$ first and then using voltage reference $V_H$.

Figure 11:
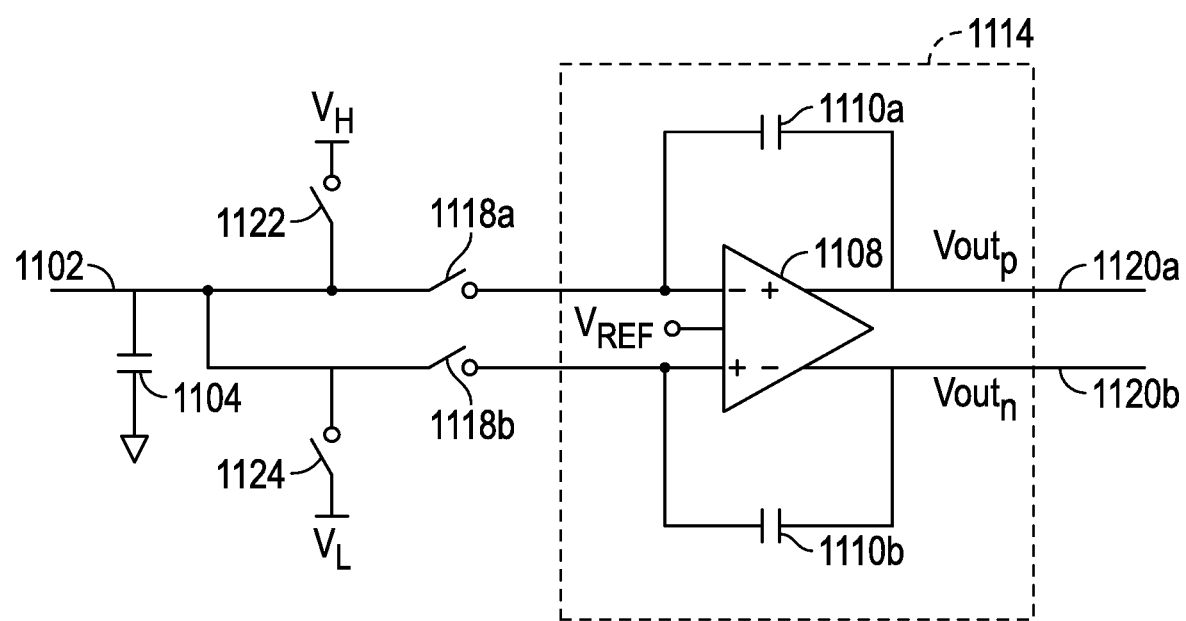
FIG. 11 illustrates an exemplary electrical circuit corresponding to a self-capacitance touch sensor electrode and corresponding discrete differential sensing circuitry according to examples of the disclosure.

Although illustrated in FIGS. 4A-4D as using a single-ended amplifier, correlated double sampling self-capacitance sensing can also be implemented using a differential amplifier. FIG. 11 illustrates an exemplary electrical circuit corresponding to a self-capacitance touch sensor electrode and corresponding discrete differential sensing circuitry according to examples of the disclosure. Electrode 1102 can have an associated self-capacitance 1104 with respect to ground. Electrode 1102 can be coupled to differential sensing circuitry 1114. Differential sensing circuitry 1114 can include a differential operational amplifier 1108 and feedback capacitors 1110a, 1110b, although other configurations can be used. The electrode 1102 can be coupled to the inverting input of differential operational amplifier 1108 via switch 1118a and the non-inverting input of differential operation amplifier 1108 via switch 1118b. The electrical circuit can also include switches 1122 and 1124 to couple electrode 1102 to voltage references $V_H$ and $V_L$ respectively. The four phases of correlated double sampling can be implemented as described above. For example, during a first phase, switches 1118a, 1118b and 1124 can be open and switch 1122 can be closed to charge up electrode 1102 to voltage reference $V_H$. During a second phase, switches 1118b, 1122 and 1124 can be open and switch 1118a can be closed to couple electrode 1102 to the inverting input of differential operational amplifier 1108 and can allow charge from the electrode 1102 to be discharged onto feedback capacitor 1110a. During a third phase, switches 1118a, 1118b and 1122 can be open and switch 1124 can be closed to charge up electrode 1102 to voltage reference $V_L$. During a fourth phase, switches 1118a, 1122 and 1124 can be open and switch 1118b can be closed to couple electrode 1102 to the non-inverting input of differential operational amplifier 1108 and can allow charge from the electrode 1102 to be discharged onto feedback capacitor 1110b. The differential output of differential operational amplifier 1108 can the difference between Voutp 1120a and Voutn 1120b, or in mathematical terms: $V_o \propto C(V_H-V_L)$.

Using a differential amplifier circuit can provide a benefit that multiple cycles of the four phases described above can be accumulated on capacitors 1110a and 1110b (i.e., multiple samples). The number of cycles can be limited by the dynamic range of differential operational amplifier 1108. In contrast, the output of a single-ended amplifier can be stored after the second and fourth phases (i.e., the integrator can be reset after each integration phase). Additionally, a differential amplifier circuit can subtract of the output from integration using $V_H$ and integration using $V_L$ in the analog domain, whereas the single-ended amplifier described above can digitally subtract the digital output results of the second and fourth phases. Although illustrated in FIG. 11 as a differential operational amplifier 1108, in other examples, two single-ended operational amplifiers can be used to provide similar functionality.

Figure 5A:
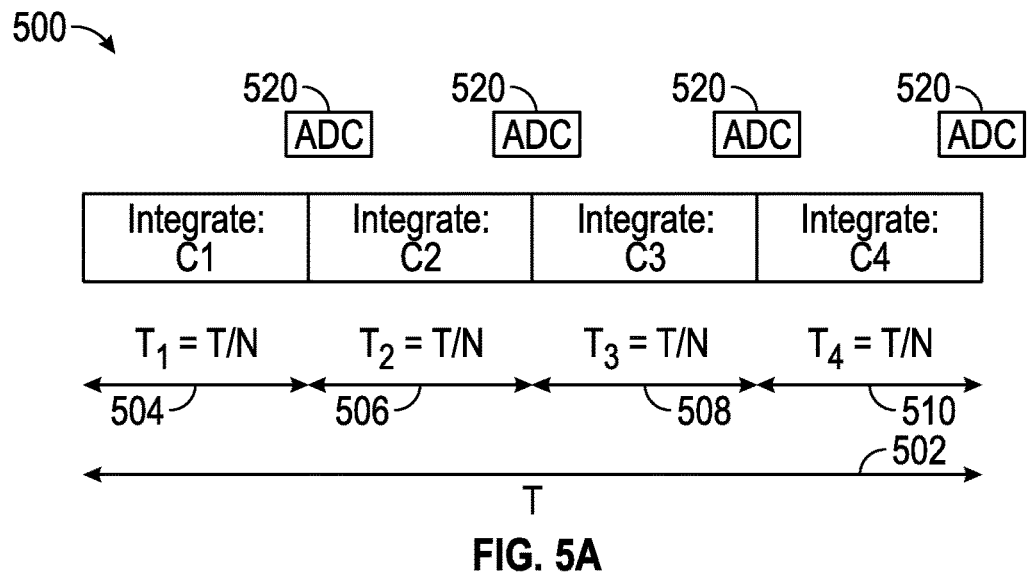
FIG. 5A illustrates an exemplary integration timing diagram for a round robin sensing scheme according to examples of the disclosure.

The signal-to-noise ratio (SNR) of the self-capacitance measurement can be related to the number of samples taken, n. For example, in a system with N electrodes per sense channel (e.g., including an integrator and analog-to-digital converter (ADC)) and a total integration time of T, the electrodes can be sensed sequentially to measure the self-capacitance of the electrode. Sensing electrodes sequentially during the integration period can be referred to as a round robin sensing scheme. FIG. 5A illustrates an exemplary integration timing diagram 500 for a round robin sensing scheme according to examples of the disclosure. In the example of FIG. 5A, four electrodes can share a sense channel, including an integrator and ADC, and the total integration time T can be divided into four integration periods, such that an electrode can be integrated n times to measure the self-capacitance of the electrode during one of the integration periods. As illustrated, the total integration time 502 can be divided into four segments, $T_1$ 504, $T_2$ 506, $T_3$ 508 and $T_4$ 510. During $T_1$ 504, a first electrode with a self-capacitance $C_1$ can be integrated n times by the shared integrator and the analog result can be converted into a digital result by shared ADC 520 at the end of $T_1$. Similarly, during subsequent integration periods $T_2$-$T_4$, $C_2$-$C_4$ can be integrated n times by the shared integrator respectively and the analog result converted into a digital result by shared ADC 520 at the end of the respective integration period. The SNR for the self-capacitance measurement of the electrodes in the system can be proportional to the square root of the number of samples during the integration time for the electrode, or in the example of FIG. 5A, $\sqrt{n}$.

Figure 5B:
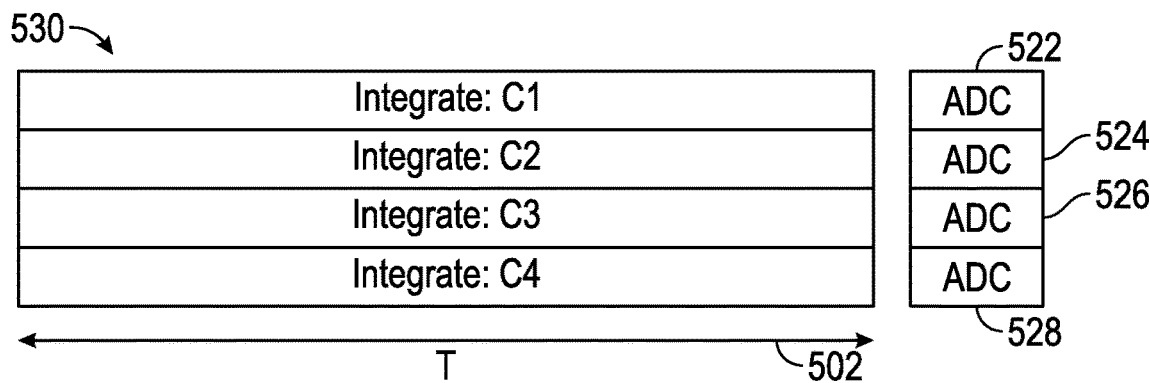
FIG. 5B illustrates an exemplary integration timing diagram for a sensing scheme using dedicated sense channels according to examples of the disclosure.

The SNR of a system can be improved without increasing the total integration time by adding additional hardware. For example, FIG. 2 illustrates a system with a dedicated operational amplifier for an electrode. FIG. 5B illustrates an exemplary integration timing diagram 530 for a sensing scheme using dedicated sense channels according to examples of the disclosure. A dedicated sense channel with an integrator can permit parallel integration of electrodes for the total integration time 502. In other words, there can be four times as many samples taken as compared with the system of FIG. 5A. At the end of T, the analog signals from dedicated integrators can be converted into digital signals using separate dedicated ADCs 522, 524, 526 and 528. The SNR can be improved to be proportional to the square root of the number of samples for the electrode, or in the example of FIG. 5B, $\sqrt{4n}$. In other words, a fourfold increase in hardware (four times more sense channels) can result in a doubling of SNR. Using dedicated integrators and ADCs, however, can increase the power consumption and area of the circuit.

Figure 5C:
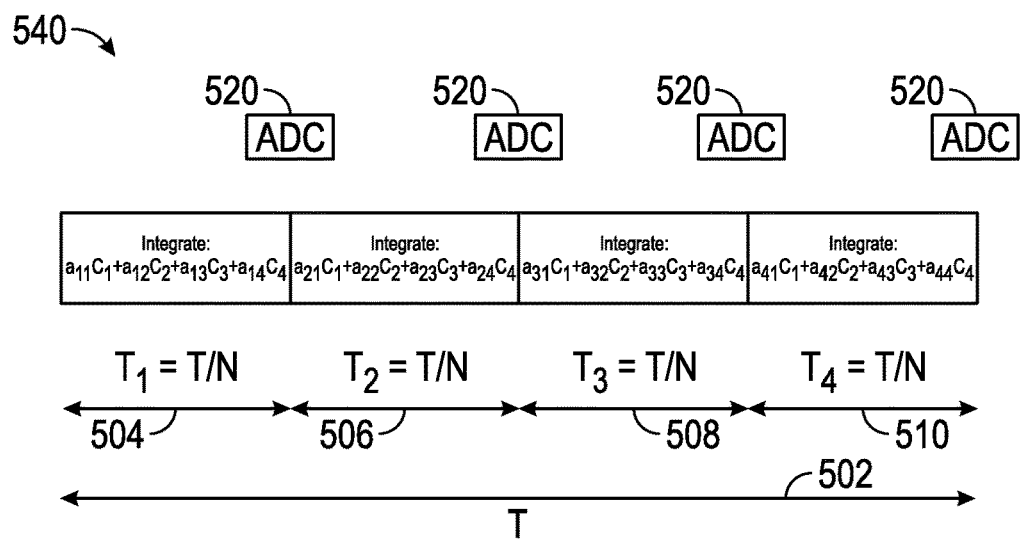
FIG. 5C illustrates an exemplary integration timing diagram for a system implementing coded integration of a self-capacitance array according to examples of the disclosure.

SNR can be improved without the need for a dedicated sense channels by implementing coded integration of a self-capacitance array. Thus, SNR can be improved without power and area penalties. FIG. 5C illustrates an exemplary integration timing diagram 540 for a system implementing coded integration of a self-capacitance array according to examples of the disclosure. As in FIG. 5A, the total integration time 502 can be divided into four integration periods, $T_1$ 504, $T_2$ 506, $T_3$ 508 and $T_4$ 510. During integration periods $T_1$-$T_4$, the sum of self-capacitance contributions from the electrodes can be sampled n times. Weighting can be assigned to capacitance contributions of the electrodes during the integration periods to encode the self-capacitance measurements. In some examples, the weighting can be either −1 or 1 as described in more detail below, but other weighting can be possible. For example, during integration period $T_1$ the output of the integration can be defined as $a_{11}C_1+a_{12}C_2+a_{13}C_3+a_{14}C_4$, where $a_{11}$-$a_{14}$ can correspond to the weighting of the self-capacitance measurements for $C_1$-$C_4$. Similarly, during subsequent integration periods $T_2$-$T_4$, different weighting can be assigned to $C_1$-$C_4$ according to a coding scheme, and combinations of capacitances $C_1$-$C_4$ can be sampled n times and integrated. At the conclusion of the total integration period, the results can be decoded to extract the capacitance values for capacitors $C_1$-$C_4$. Because capacitors $C_1$-$C_4$ can be sampled n times during an integration period for integration periods $T_1$-$T_4$, the SNR can be proportional to the square root of the number of samples, or in the example of FIG. 5C, $\sqrt{4n}$. Thus, coded integration illustrated in FIG. 5C can achieve the same doubling of SNR as the example illustrated in FIG. 5B, but uses less hardware.

The total charge accumulated at the integrator during a full integration period can be expressed as $Q_{total}=n \times V \times A \times C$, where $Q_{total}$ can be a vector representing the total charge accumulated at the end of the integration periods (e.g., $T_1$-$T_4$), n can be the number of samples taken during an integration period, V can be a scalar representing the voltage used to charge up the electrodes (e.g., $V_H$ or $V_L$ if correlated double sampling is used), A can be a matrix representing the weighting values for the self-capacitance of the electrodes during the integration periods and C can be a vector representing the self-capacitance of the electrodes $C_1$-$C_4$. Thus, for the four electrode example in FIG. 5C, the total charge can be expressed as in equation 1:

$$\begin{bmatrix} Q_{total,1} \\ Q_{total,2} \\ Q_{total,3} \\ Q_{total,4} \end{bmatrix} = n \times V \times \begin{bmatrix} a_{11} & \cdots & a_{14} \\ \vdots & \ddots & \vdots \\ a_{41} & \cdots & a_{44} \end{bmatrix} \times \begin{bmatrix} C_1 \\ C_2 \\ C_3 \\ C_4 \end{bmatrix} \quad (1)$$

At the conclusion of the integration periods lasting the total integration time, self-capacitances $C_1$-$C_4$ can be determined (i.e., decoded) by multiplying $Q_{total}$ by the inverse of A, i.e. $A^{-1}$, and dividing by V and n. Mathematically this could be expressed as:

$$C = \frac{A^{-1}}{n \times V} \times Q_{total}.$$

Implementing coded integration of the self-capacitance array successfully can require that matrix A be invertible and have a gain greater than zero. Implementing coded integration of the self-capacitance array to provide an SNR benefit can further require that the gain of matrix A be at least unity. Various codes can be selected to satisfy the above conditions. For example, a Hadamard matrix can be used, each row of the matrix representing the polarity for the self-capacitance contribution of the electrodes during an integration period, because Hadamard matrixes can contain entries of 1 and −1 (corresponding to polarity of the self-capacitance contribution), can be invertible and can have gains of at least 1. Although, rows can correspond to the polarity for the self-capacitance contribution and columns can correspond to the electrodes, in other examples the correspondence can be reversed so that columns correspond to the polarity of the self-capacitance contribution and rows can correspond to the electrodes.

Figure 6:
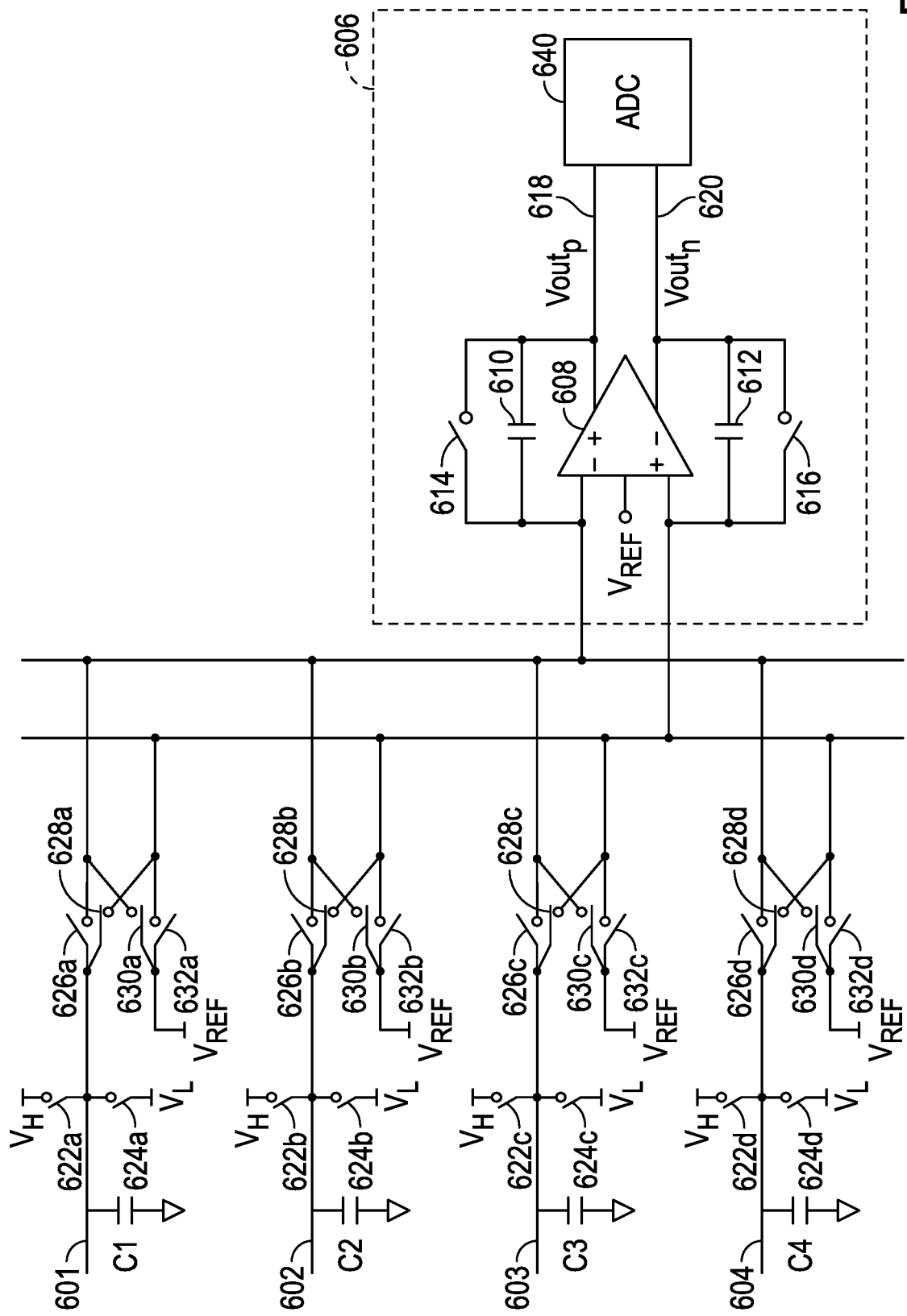
FIG. 6 illustrates an exemplary differential circuit implementing coded integration of a self-capacitance array according to examples of the disclosure.

The correlated double sampling described above with reference to FIG. 4 and the coded integration of self-capacitance described above with respect to FIG. 5C can be combined to improve noise immunity and increase SNR for self-capacitance measurements. FIG. 6 illustrates an exemplary differential circuit implementing coded integration of a self-capacitance array according to examples of the disclosure. FIG. 6 illustrates four electrodes 601, 602, 603 and 604 with corresponding self-capacitances $C_1$, $C_2$, $C_3$ and $C_4$. Electrodes 601-604 can be coupled to sensing circuitry 606 using switches described in more detail below. Sensing circuitry 606 can include a fully differential operational amplifier 608, feedback capacitors 610 and 612, and switches 614 and 616, although other configurations can be used. Fully differential operational amplifier 608 can have two feedback paths available for integrating the self-capacitances of electrodes 601-604. The first feedback path can include capacitor 610 and switch 614 between the inverting input of differential operational amplifier 608 and the positive output 618 of differential operational amplifier 608. The second feedback path can include capacitor 612 and switch 616 between the non-inverting input of differential operational amplifier 608 and the negative output 620 of differential operational amplifier 608. Thus, the first feedback path can be a first integrator circuit capable of integrating electrodes assigned a weighting of +1 (positive contributions) and the second feedback path can be a second integrator circuit capable of integrating electrodes assigned a weighting of −1 (negative contributions). The positive output 618 and negative output 620 can be subtracted and converted to a digital value at differential ADC 640. Thus, by selectively coupling electrodes 601-604 to either the inverting or non-inverting input of differential operational amplifier 608, composite measurements of self-capacitances $C_1$-$C_4$ can be made with varying weightings assigned to capacitance contributions during integration periods.

For simplicity of description, the operation of various switches to reset sensing circuitry 606 is first described and then omitted from the discussion of coded integration. If necessary, sensing circuitry 606 can be reset by closing switches 614, 616, 630a-d and 632a-d ("reset switches") and leaving switches 626a-d and 628a-d open. The sensing circuitry 606 can be reset when necessary to discharge the integration capacitor (e.g., while charging up an electrode to $V_H$ or $V_L$). Additionally, for simplicity the operation of the various switches for charging and integrating electrodes can be first described with respect to electrode 601 and then extended to the electrodes 602-604. During a first phase, electrode 601 can be disconnected from sensing circuitry

606 by open switches 626a and 628a and can be charged to reference voltage $V_H$ via closed switch 622a. During a second phase, the self-capacitance of electrode 601, $C_1$, can be coupled to the inverting input of differential operational amplifier 608 via closed switch 626a (e.g., first integrator circuit). The remaining switches, including the reset switches, voltage reference switches 622a and 624a, and switch 628a, can be left open. Thus, $C_1$ can be integrated during the second phase. During a third phase, electrode 601 can be disconnected from sensing circuitry 606 by open switches 626a and 628a and can be charged to reference voltage $V_L$ via closed switch 624a. During a fourth phase, the self-capacitance of electrode 601, $C_1$, can be coupled to the non-inverting input of differential operational amplifier 608 via closed switch 628a (e.g., second integrator circuit). The remaining switches, including the reset switches, voltage reference switches 622a and 624a, and switch 626a, can be left open. Thus, $C_1$ can be integrated during the fourth phase.

The four phases described above can follow the four phases of the correlated double sampling self-capacitance measurements of FIG. 4. The second and fourth phases can be repeated to sample and integrate the self-capacitance during corresponding integration periods of FIG. 5C. In the four phases described above, the polarity of the self-capacitance measurement can be considered positive when electrode 601 couples to the inverting input of differential operational amplifier 608 via switch 626a during a second phase (corresponding to using voltage reference $V_H$) or when electrode 601 couples to the non-inverting input of differential operational amplifier 608 via switch 628a during a fourth phase (corresponding to using voltage reference $V_L$). In contrast, the polarity of the self-capacitance measurement can be considered negative when electrode 601 couples to the non-inverting input of differential operational amplifier 608 via switch 628a during a second phase or when electrode 601 couples to the inverting input of differential amplifier 608 via switch 626a during a fourth phase. Thus, switches 626a and 628a can be used to determine the polarity of a self-capacitance measurement during an integration period. Switches 626a and 628a can be controlled, for example, based on the value of an element in the matrix A corresponding to the integration period for a given electrode. For example, an entry of +1 in matrix A corresponding to electrode 601 during integration period $T_1$ can correspond to closing switch 626a and leaving switch 628a open during integration phases using $V_H$ (second phase) of integration period $T_1$, and closing switch 628a and leaving switch 626a open during integration phases using $V_L$ (fourth phase) of integration period $T_1$. An entry of −1 in matrix A corresponding to electrode 601 during integration period $T_1$ can correspond to closing switch 628a and leaving switch 626a open during integration phases using $V_H$ (second phase) of integration period $T_1$, and closing switch 626a and leaving switch 628a open during integration phases using $V_L$ (fourth phase) of integration period $T_1$.

Switches 622a-d, 624a-d can exhibit the same behavior during the four phases for self-capacitance measurements of $C_1$-$C_4$ to appropriately charge electrodes 601-604 to the appropriate voltage reference. Likewise, switches 626a-d and 628a-d can be used to control the polarity of the self-capacitance measurement for $C_1$-$C_4$ during integration phases. For example, during an integration period (e.g., $T_1$), the polarity of $C_1$ and $C_4$ measurements can be positive and the polarity of $C_2$ and $C_3$ can be negative based on the values in a row of matrix A. Thus, during the integration phases using $V_H$, switches 626a, 628b, 628c and 626d can be closed and switches 628a, 626b, 626c and 628d can be opened. During integration phases using $V_L$, the switch positions can be reversed. The switches can be controlled during the subsequent integration periods (e.g., $T_2$-$T_4$), so that at the polarity of self-integration can be used to code the self-capacitance measurement according to the values in matrix A. At the conclusion of the total integration time (e.g., after integration periods $T_1$-$T_4$), capacitances $C_1$-$C_4$ can be decoded as described above with respect to FIG. 5C.

Figure 7:
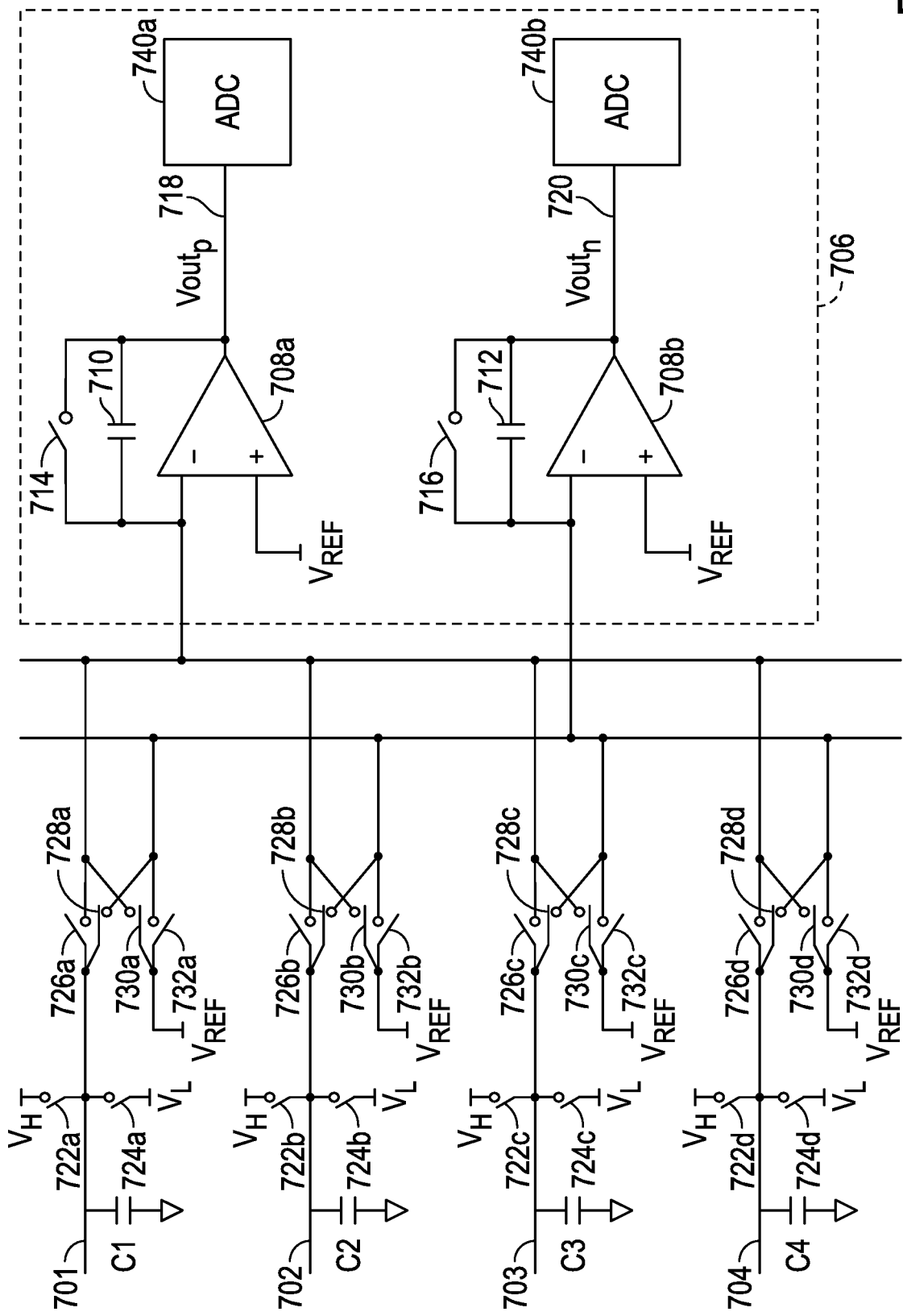
FIG. 7 illustrates an exemplary single-ended circuit implementing coded integration of a self-capacitance array according to examples of the disclosure.

FIG. 7 illustrates an exemplary single-ended circuit implementing coded integration of a self-capacitance array according to examples of the disclosure. The capacitances of electrodes 701, 702, 703 and 704, $C_1$-$C_4$, can be measured via sensing circuitry 706. Sensing circuitry 706 can include a pair of operational amplifiers 708a and 708b. Operational amplifier 708a can have a feedback path included feedback capacitor 710 and switch 714 (e.g., first integrator circuit). Operational amplifier 708b can have a feedback path included feedback capacitor 712 and switch 716 (e.g., second integrator circuit). The output 718 of operational amplifier 708a can be coupled to ADC 740a and the output 720 of operational amplifier 708b can be coupled to ADC 740b. The output of ADC 740a and ADC 740b can be subtracted digitally to generate a composite measurement of self-capacitance of the input electrodes. Although illustrated as separate ADCs 740a and 740b, in some examples, outputs 718 and 720 can be subtracted in the analog domain before being converted to digital using a differential ADC. Thus, sensing circuitry 706 can behave in a similar manner as sensing circuitry 606. Likewise, switches 714, 716, 722a-d, 724a-d, 726a-d, 728a-d, 730a-d and 732a-d can operate in a similar manner as the corresponding switches 614, 616, 622a-d, 624a-d, 626a-d, 628a-d, 630a-d and 632a-d. Accordingly, switches 726a-d and 728a-d can be used for coded integration of self-capacitance for an array of electrodes.

Figure 10:
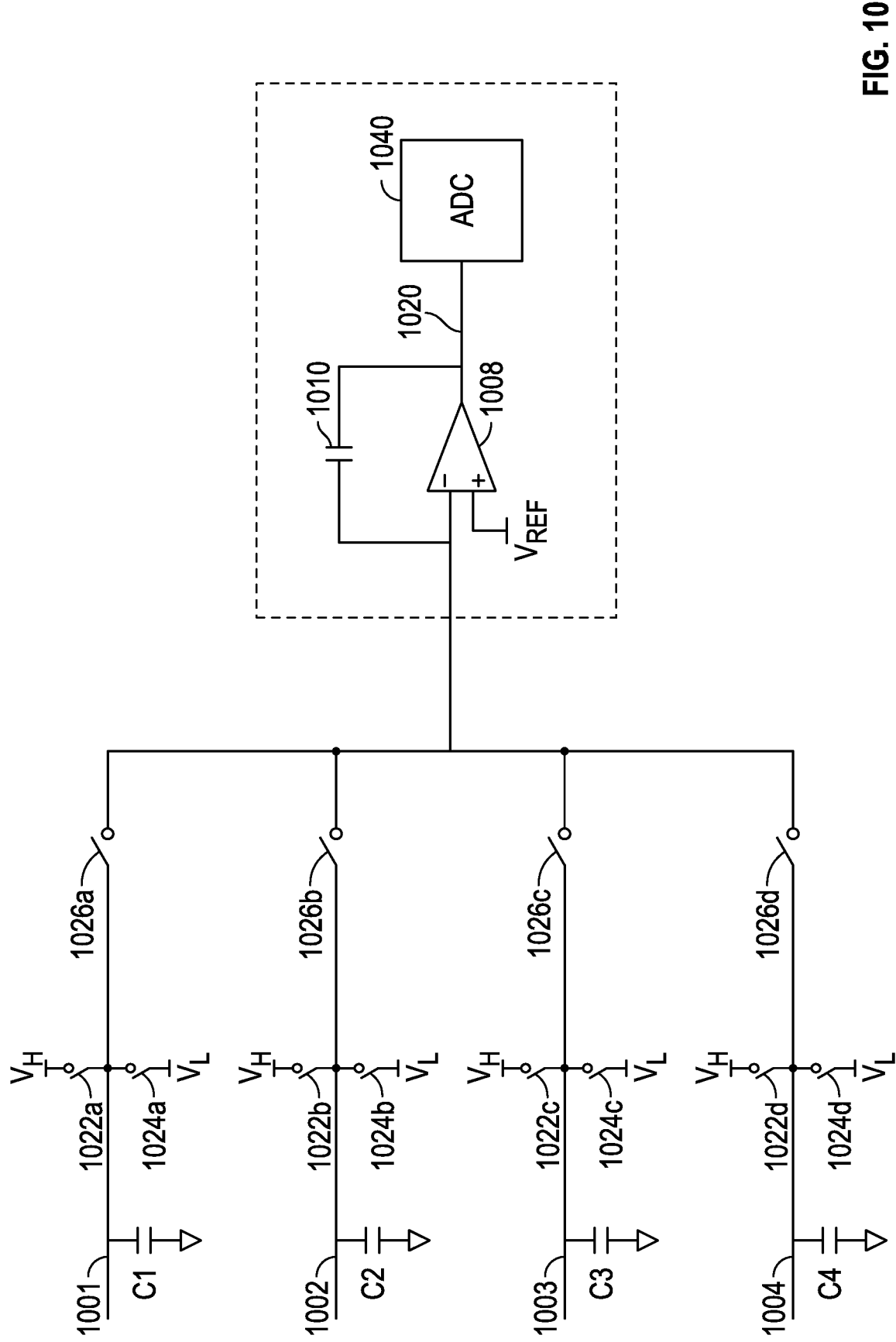
FIG. 10 illustrates an exemplary circuit implementing coded integration of a self-capacitance array using a single-ended integrator according to examples of the disclosure.

Although FIGS. 6 and 7 illustrate coded integration of a self-capacitance array using two integrator circuits, coded integration can be implemented using a single single-ended integrator. FIG. 10 illustrates an exemplary circuit implementing coded integration of a self-capacitance array using a single-ended integrator according to examples of the disclosure. The self-capacitance of electrodes 1001, 1002, 1003 and 1004, $C_1$-$C_4$, can be measured via sensing circuitry 1006. Sensing circuitry 1006 can include an operational amplifier 1008. Operational amplifier 1008 can be configured as an integrator with a feedback path including feedback capacitor 1010. The output of amplifier 1008 can be coupled to ADC 1040. Unlike, in FIGS. 6 and 7, the sensing circuitry 1006 cannot integrate positive and negative contributions in parallel. Instead, sensing circuitry 1006 can first integrate positive contributions from electrodes coupled via switches 1026a-d according to a code. The output 1020 can be converted to a first digital signal via ADC 1040. The sensing circuitry 1006 can be reset (reset switches not illustrated) and then the sensing circuitry can integrate the negative contributions from electrodes coupled via switches 1026a-d according to the code (e.g., switches 1026a-d can reverse position compared with the first integration). The output 1020 can be converted to a second digital signal via ADC 1040. The first and second digital results can be subtracted digitally to generate a composite measurement of self-capacitance of the input electrodes. Thus, sensing circuitry 1006 can behave in a similar manner as sensing circuitry 606 or 706. Accordingly, switches 1026a-d can be used for coded integration of self-capacitance for an array of electrodes. Using one single-ended integrator can require faster operation of the ADC to store integration results from the "positive" and "negative" contributions sequentially, whereas using two single-ended integrators or a differential integrator can integrate multiple signals without resetting the circuit and can store the integration results from the "positive" and "negative" contributions in parallel, thus allowing for slower operation the ADC.

Figure 8:
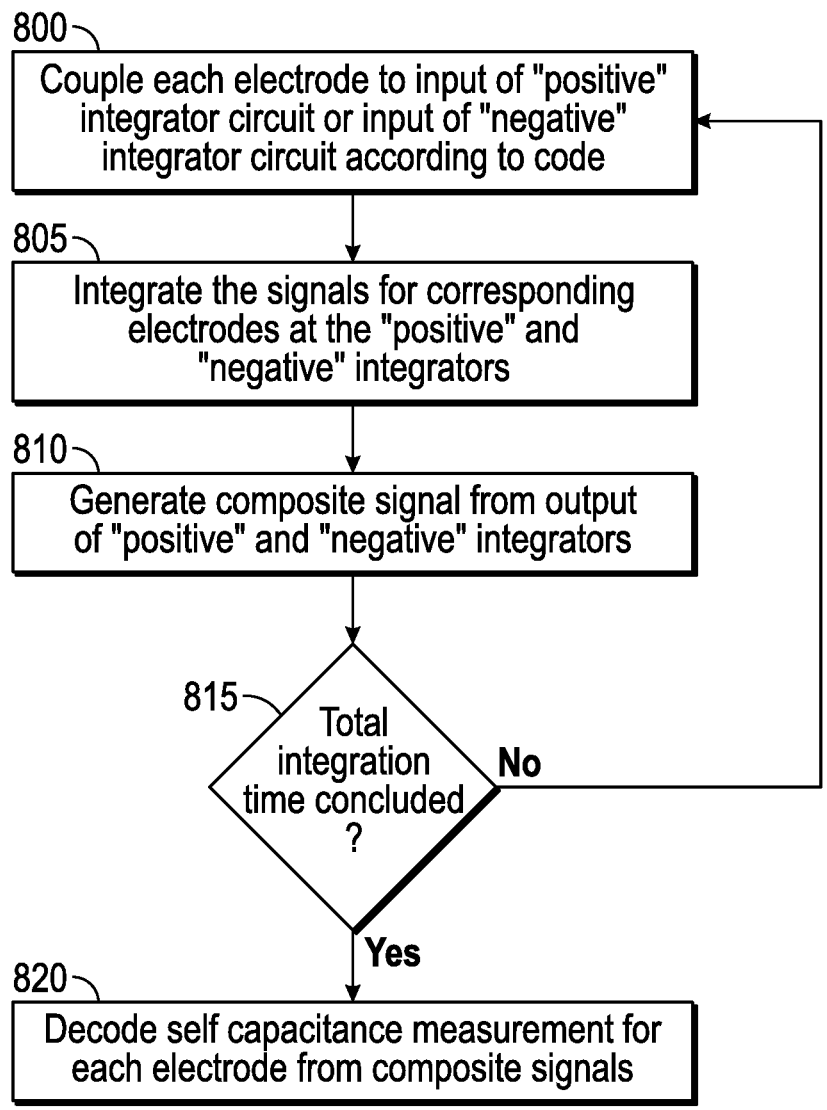
FIG. 8 illustrates an exemplary algorithm for coded integration of a self-capacitance array according to examples of the disclosure.

Although FIGS. 6-8 illustrate coded integration of self-capacitance arrays for four electrodes, it is to be understood that a different number of electrodes can be used for coded integration of self capacitance arrays. Additionally, although various switches are illustrated as separate from sensing circuitry, in other examples, the switches can be incorporated within the sensing circuitry. Additionally, although some examples illustrate coded integration applying weighting to capacitance measurements in the digital domain (e.g., integration using one single-ended amplifier) and other examples apply weighting using a differential integrator or a pair of single-ended integrators, in other examples, the weighting can be applied using other circuit configurations to accomplish the general principles of coded integration of the self-capacitance array.

Additionally, coded integration of self-capacitance arrays can be implemented in circuits using an offset capacitor. Offset capacitors can be useful to remove large capacitances that can mask the smaller capacitance signal of interest (e.g., the change in capacitance due to an object touching or in proximity to the self-capacitance array). The offset capacitor can be coupled to the sensing circuitry and assigned a weighting (e.g., −1), such that the offset capacitance can be subtracted from the composite output signal.

Although described above in the context of a sense channel using operational amplifier integrators, the sense channel can include additional components including filters or gain amplifiers, for example. Additionally, the same coded integration principles can be implemented for a leaky integrator sensing circuitry design (e.g., using a comparator and counter).

FIG. 8 illustrates an exemplary algorithm for coded integration of a self-capacitance array according to examples of the disclosure. The system can couple the electrodes to an input of either the "positive" integrator circuit or the "negative" integrator circuit according to a code during the integration period (800). The "positive" and "negative" integrators can be a pair of single-ended integrators or a differential integrator, for example. The "positive" integrator circuit can correspond to the integrator circuit integrating electrodes coded to have a positive polarity contribution to the composite output signal. The "negative" integrator circuit can correspond to the integrator circuit integrating electrodes coded to have a negative polarity contribution to the composite output signal. The "positive" and "negative" integrator circuits can integrate the signals from the corresponding electrodes coupled to their respective inputs (805). The system can generate a composite output signal from the outputs of the "positive" and "negative" integrators (810). For example, the composite signal can be the difference between the output of the "positive" integrator and the output of the "negative" integrator. The system can determine whether the total integration period for a self-capacitance measurement has concluded (815). If the total integration period has not concluded, the system can return to 800 and couple the electrodes to the "positive" and "negative" integrators according to the code for the next integration period. If the total integration period has concluded, the system can decode the composite signals generated during the integration periods to determine self-capacitance measurements for the electrodes (820).

Although as illustrated in FIG. 8 the illustrates the exemplary algorithm can use a pair of single-ended integrators or a differential integrator to correspond to "positive" and "negative" integrators, the algorithm can also apply to sensing circuitry including one time-multiplexed single-ended integrator. The "positive" integrator can correspond to the integrator circuit during the time period for integrating positive contributions and the "negative" integrator can correspond to the integrator circuit during the time period for integrating negative contributions. The output of these time-multiplexed integrations can be stored digitally and subtracted to generate composite output signals.

Figures 9A, 9B:
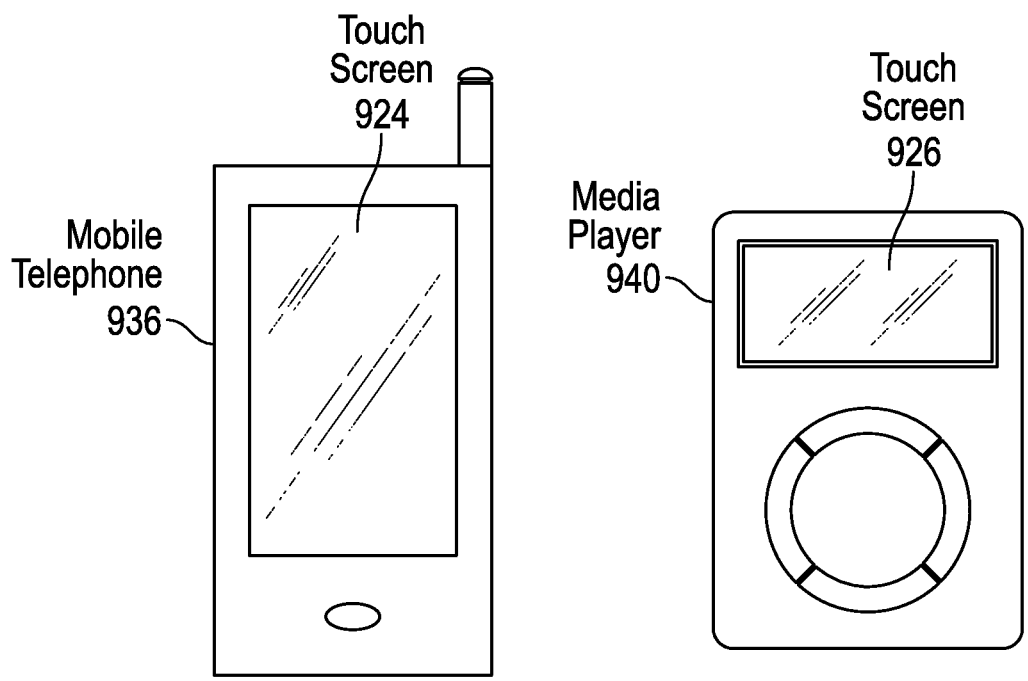
FIGS. 9A-9D illustrate example systems in which the algorithm for coded integration of a self-capacitance array according to examples of the disclosure can be implemented.
Figures 9C, 9D:
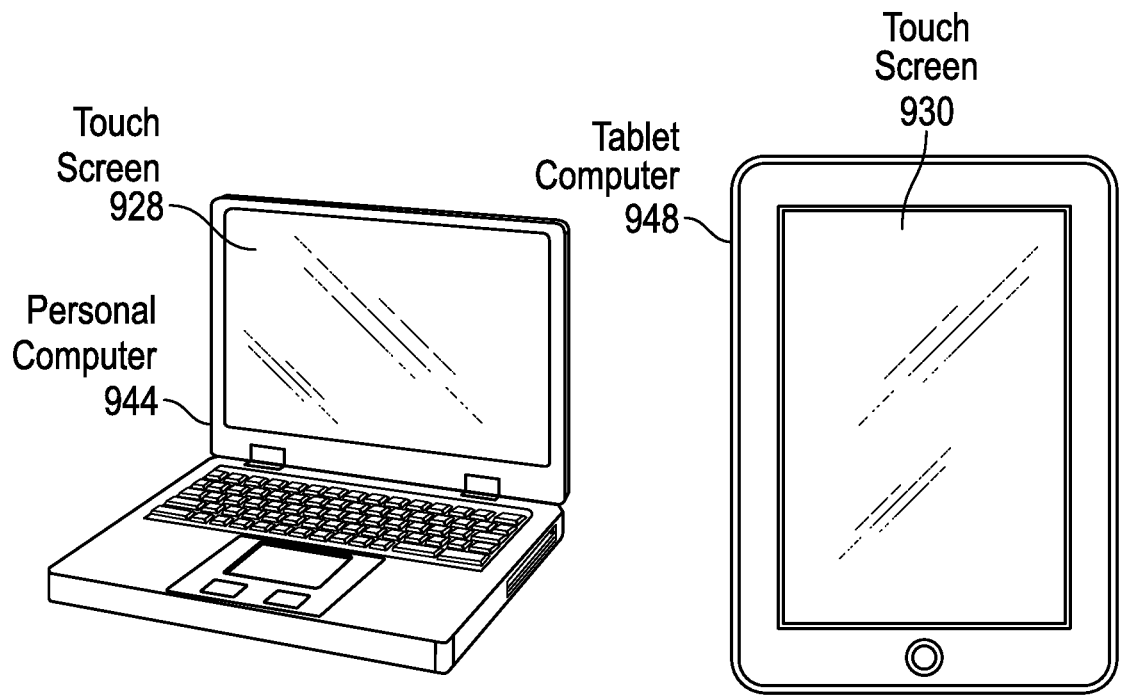

FIGS. 9A-9D illustrate example systems in which the algorithm for coded integration of a self-capacitance array according to examples of the disclosure can be implemented. FIG. 9A illustrates an example mobile telephone 936 that includes a touch screen 924 and other computing system blocks that can implement the algorithm for coded integration of a self-capacitance array according to various examples. FIG. 9B illustrates an example digital media player 940 that includes a touch screen 926 and other computing system blocks that can implement the algorithm for coded integration of a self-capacitance array according to various examples. FIG. 9C illustrates an example personal computer 944 that includes a touch screen 928 and other computing system blocks that can implement the algorithm for coded integration of a self-capacitance array according to various examples. FIG. 9D illustrates an example tablet computing device 948 that includes a touch screen 930 and other computing system blocks that can implement the algorithm for coded integration of a self-capacitance array according to various examples. The touch screen and computing system blocks that can implement the algorithm for coded integration of a self-capacitance array can be implemented in other devices including in wearable devices.

Therefore, according to the above, some examples of the disclosure are directed to a method for measuring a self-capacitance of a plurality of electrodes. The method can comprise coupling the plurality of electrodes to a sense channel during a plurality of integration periods, wherein at least two of the plurality of electrodes can be simultaneously coupled to the sense channel during at least one of the plurality of integration periods, generating a plurality of composite output signals, one or more of the plurality of composite output signals based on an output of the sense channel during a corresponding integration period, and demodulating the plurality of composite output signals to extract a self-capacitance measurement for the plurality of electrodes. Additionally or alternatively to one or more examples disclosed above, the method can further comprise integrating a first input signal comprising signal contributions from one or more of the plurality of electrodes coupled to an input of a first integrator circuit and integrating a second input signal comprising signal contributions from one or more of the plurality of electrodes coupled to an input of a second integrator circuit. Additionally or alternatively to one or more examples disclosed above, an output of the first integrator circuit can correspond to a positive contribution of the first input signal and an output of the second integrator circuit can correspond to a negative contribution of the second input signal. Additionally or alternatively to one or more examples disclosed above, the first and second integrator circuits can be implemented using two single-ended operational amplifiers. Additionally or alternatively to one or more examples disclosed above, the first and second integrator circuits can be implemented using a differential operational amplifier and the first and second input signals can be integrated differentially. Additionally or alternatively to one or more examples disclosed above, the sense channel can comprise a leaky integrator circuit. Additionally or alternatively to one or more examples disclosed above, the plurality of electrodes can be coupled to the input of the first integrator circuit or the input of the second integrator circuit via one or more switches. Additionally or alternatively to one or more examples disclosed above, the coupling of the plurality of electrodes during the plurality of integration periods can be coded based on a value of a plurality of values stored in memory. Additionally or alternatively to one or more examples disclosed above, an electrode can be coupled to the first integrator circuit during an integration period if the value of the plurality of values corresponding to the electrode and the integration period is 1 and the electrode can be coupled to the second integrator circuit during the integration period if the value of the plurality of values corresponding to the electrode and the integration period is −1. Additionally or alternatively to one or more examples disclosed above, the plurality of values can be selected such that a matrix formed of the plurality of values, arranged such that a first dimension of the matrix corresponds to the plurality of integration periods and a second dimension of the matrix corresponds to the plurality of electrodes, is invertible and has a gain greater than unity. Additionally or alternatively to one or more examples disclosed above, the plurality of values can correspond to entries of a Hadamard matrix of an order equal to a total number of electrodes in the plurality of electrodes. Additionally or alternatively to one or more examples disclosed above, the method can further comprise generating a first composite output signal corresponding to a first voltage reference, generating a second composite output signal corresponding to a second voltage reference, and subtracting the second composite output signal from the first composite output signal to remove noise. Additionally or alternatively to one or more examples disclosed above, generating the plurality of composite output signals can further comprise subtracting an output of the second integrator circuit from an output of the first integrator circuit. Additionally or alternatively to one or more examples disclosed above, demodulating the plurality of composite output signals can comprise decoding the self-capacitance measurement for the plurality of electrodes based on an inverse of the plurality of values. Additionally or alternatively to one or more examples disclosed above, the method can further comprise integrating a first input signal comprising signal contributions from one or more of the plurality of electrodes coupled to the input of an integrator circuit during a first portion of an integration period, integrating a second input signal comprising signal contributions from one or more of the plurality of electrodes coupled to the input of the integrator circuit during a second portion of the integration period, and generating a composite output signal based on the difference between an output of the integrator circuit during the first portion of the integration period and the output of the integrator circuit during the second portion of the integration period.

Other examples of the disclosure are directed to an apparatus for measuring self-capacitance. The apparatus can comprise sensing circuitry configured to be coupled to a plurality of electrodes via a plurality of switches, logic configurable to control the plurality of switches to couple the plurality of electrodes to the sensing circuitry, wherein the plurality of switches can be controlled to simultaneously couple the sensing circuitry to at least two of the plurality of electrodes, and a demodulation section configurable to decode a plurality of outputs of the sensing circuitry to determine the self-capacitance of the plurality of electrodes. Additionally or alternatively to one or more examples disclosed, the sense circuitry can comprise a first integrator circuit and a second integrator circuit and the plurality of switches can be configurable to couple the plurality of electrodes to an input of the first integrator circuit or an input of the second integrator circuit. Additionally or alternatively to one or more examples disclosed, the first and second integrator circuits can be implemented using two single-ended operational amplifiers. Additionally or alternatively to one or more examples disclosed, the first and second integrator circuits can be implemented using two single-ended operational amplifiers. Additionally or alternatively to one or more examples disclosed, the first and second integrator circuits can be implemented using a differential operational amplifier. Additionally or alternatively to one or more examples disclosed, the sensing circuitry can comprise a leaky integrator circuit. Additionally or alternatively to one or more examples disclosed, the sensing circuitry can further comprise a differential analog-to-digital converter (ADC), and an output of the first integrator circuit can be coupled to a first input of the differential ADC and an output of the second integrator circuit can be coupled to a second input of the differential ADC. Additionally or alternatively to one or more examples disclosed, the first integrator circuit can integrate a first input signal comprising signal contributions from one or more of the plurality of electrodes coupled to the input of the first integrator circuit and the second integrator circuit can integrate a second input signal comprising signal contributions from one or more of the plurality of electrodes coupled to the input of the second integrator circuit. Additionally or alternatively to one or more examples disclosed, an output of the first integrator circuit can correspond to a positive contribution of the first composite input signal and an output of the second integrator circuit can correspond to a negative contribution of the second composite input signal. Additionally or alternatively to one or more examples disclosed, the logic can be configurable to control the plurality of switches selects the coupling between the plurality of electrodes and the input of the first or second integrator circuits during a plurality of integration periods based on a value of a plurality of values stored in memory. Additionally or alternatively to one or more examples disclosed, the plurality of values can be selected to code signal contributions of the plurality of electrodes. Additionally or alternatively to one or more examples disclosed, the first integrator circuit can be configurable to be coupled to an electrode during an integration period if the value of the plurality of values corresponding to the electrode and the integration period is 1 and the second integrator circuit can be configurable to be coupled to the electrode during the integration period if the value of the plurality of values corresponding to the electrode and the integration period is −1. Additionally or alternatively to one or more examples disclosed, the plurality of values can be selected such that a matrix formed of the plurality of values, arranged such that a first dimension of the matrix corresponds to a plurality of integration periods and a second dimension of the matrix corresponds to the plurality of electrodes, is invertible and has a gain greater than unity. Additionally or alternatively to one or more examples disclosed, the plurality of values can correspond to entries of a Hadamard matrix of an order equal to a total number of electrodes in the plurality of electrodes. Additionally or alternatively to one or more examples disclosed, the sensing circuitry can be configurable to generate, during an integration period, a first composite output signal corresponding to a first voltage reference, a second composite output signal corresponding to a second voltage reference and subtract the second composite output signal from the first composite output signal to remove noise. Additionally or alternatively to one or more examples disclosed, the plurality of outputs of the sensing circuitry can be generated by subtracting an output of the second integrator circuit from an output of the first integrator circuit during a plurality of integration periods. Additionally or alternatively to one or more examples disclosed, the demodulation section can decode the self-capacitance measurement from the plurality of outputs of the sensing circuitry based on an inverse of the plurality of values. Additionally or alternatively to one or more examples disclosed, the sensing circuitry can be configurable to integrate a first input signal comprising signal contributions from one or more of the plurality of electrodes coupled to an input of an integrator circuit during a first portion of an integration period, integrate a second input signal comprising signal contributions from one or more of the plurality of electrodes coupled to the input of the integrator circuit during a second portion of the integration period, and generate a composite output signal based on the difference between an output of the integrator circuit during the first portion of the integration period and the output of the integrator circuit during the second portion of the integration period.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the appended claims.

What is claimed is:

1. A method for measuring a self-capacitance of a plurality of electrodes, the method comprising:
   coupling the plurality of electrodes to a sense channel during a plurality of integration periods, wherein at least two of the plurality of electrodes are simultaneously coupled to the sense channel during at least one of the plurality of integration periods;
   generating a plurality of composite output signals, one or more of the plurality of composite output signals based on an output of the sense channel during a corresponding integration period; and
   demodulating the plurality of composite output signals to extract a self-capacitance measurement for the plurality of electrodes.

2. The method of claim 1, further comprising:
   integrating a first input signal comprising signal contributions from one or more of the plurality of electrodes coupled to an input of a first integrator circuit; and
   integrating a second input signal comprising signal contributions from one or more of the plurality of electrodes coupled to an input of a second integrator circuit.

3. The method of claim 2, wherein an output of the first integrator circuit corresponds to a positive contribution of the first input signal and an output of the second integrator circuit corresponds to a negative contribution of the second input signal.

4. The method of claim 2, wherein the first and second integrator circuits are implemented using two single-ended operational amplifiers.

5. The method of claim 2, wherein the first and second integrator circuits are implemented using a differential operational amplifier and the first and second input signals are integrated differentially.

6. The method of claim 1, wherein the sense channel comprises a leaky integrator circuit.

7. The method of claim 2, wherein the plurality of electrodes are coupled to the input of the first integrator circuit or the input of the second integrator circuit via one or more switches.

8. The method of claim 2, wherein the coupling of the plurality of electrodes during the plurality of integration periods is coded based on a plurality of values stored in memory.

9. The method of claim 8, wherein an electrode is coupled to the first integrator circuit during an integration period if a value of the plurality of values corresponding to the electrode and the integration period is 1 and the electrode is coupled to the second integrator circuit during the integration period if the value of the plurality of values corresponding to the electrode and the integration period is −1.

10. The method of claim 8, wherein the plurality of values are selected such that a matrix formed of the plurality of values, arranged such that a first dimension of the matrix corresponds to the plurality of integration periods and a second dimension of the matrix corresponds to the plurality of electrodes, is invertible and has a gain greater than unity.

11. The method of claim 10, wherein the plurality of values correspond to entries of a Hadamard matrix of an order equal to a total number of electrodes in the plurality of electrodes.

12. The method of claim 1, further comprising:
   generating a first composite output signal corresponding to a first voltage reference;
   generating a second composite output signal corresponding to a second voltage reference; and
   subtracting the second composite output signal from the first composite output signal to remove noise.

13. The method of claim 2, wherein generating the plurality of composite output signals further comprises subtracting an output of the second integrator circuit from an output of the first integrator circuit.

14. The method of claim 8, wherein demodulating the plurality of composite output signals comprises decoding the self-capacitance measurement for the plurality of electrodes based on an inverse of the plurality of values.

15. The method of claim 1, further comprising:
   integrating a first input signal comprising signal contributions from one or more of the plurality of electrodes coupled to the input of an integrator circuit during a first portion of an integration period;
   integrating a second input signal comprising signal contributions from one or more of the plurality of electrodes coupled to the input of the integrator circuit during a second portion of the integration period; and
   generating a composite output signal based on the difference between an output of the integrator circuit during the first portion of the integration period and the output of the integrator circuit during the second portion of the integration period.

16. An apparatus for measuring self-capacitance, the apparatus comprising:
   sensing circuitry configured to be coupled to a plurality of electrodes via a plurality of switches;
   logic configurable to control the plurality of switches to couple the plurality of electrodes to the sensing circuitry, wherein the plurality of switches can be controlled to simultaneously couple the sensing circuitry to at least two of the plurality of electrodes; and a demodulation section configurable to decode a plurality of outputs of the sensing circuitry to determine the self-capacitance of the plurality of electrodes.

17. The apparatus of claim 16, wherein the sense circuitry comprises a first integrator circuit and a second integrator circuit and the plurality of switches configurable to couple the plurality of electrodes to an input of the first integrator circuit or an input of the second integrator circuit.

18. The apparatus of claim 17, wherein the first and second integrator circuits are implemented using two single-ended operational amplifiers.

19. The apparatus of claim 17, wherein the first and second integrator circuits are implemented using a differential operational amplifier.

20. The apparatus of claim 16, wherein the sensing circuitry comprises a leaky integrator circuit.

21. The apparatus of claim 17, wherein the sensing circuitry further comprises a differential analog-to-digital converter (ADC), and an output of the first integrator circuit is coupled to a first input of the differential ADC and an output of the second integrator circuit is coupled to a second input of the differential ADC.

22. The apparatus of claim 17, wherein the first integrator circuit integrates a first input signal comprising signal contributions from one or more of the plurality of electrodes coupled to the input of the first integrator circuit and the second integrator circuit integrates a second input signal comprising signal contributions from one or more of the plurality of electrodes coupled to the input of the second integrator circuit.

23. The apparatus of claim 22, wherein an output of the first integrator circuit corresponds to a positive contribution of the first composite input signal and an output of the second integrator circuit corresponds to a negative contribution of the second composite input signal.

24. The apparatus of claim 17, wherein the logic configurable to control the plurality of switches selects the coupling between the plurality of electrodes and the input of the first or second integrator circuits during a plurality of integration periods based on a plurality of values stored in memory.

25. The apparatus of claim 24, wherein the plurality of values are selected to code signal contributions of the plurality of electrodes.

26. The apparatus of claim 25, wherein the first integrator circuit is configurable to be coupled to an electrode during an integration period if a value of the plurality of values corresponding to the electrode and the integration period is 1 and the second integrator circuit is configurable to be coupled to the electrode during the integration period if the value of the plurality of values corresponding to the electrode and the integration period is −1.

27. The apparatus of claim 25, wherein the plurality of values are selected such that a matrix formed of the plurality of values, arranged such that a first dimension of the matrix corresponds to the plurality of integration periods and a second dimension of the matrix corresponds to the plurality of electrodes, is invertible and has a gain greater than unity.

28. The apparatus of claim 27, wherein the plurality of values correspond to entries of a Hadamard matrix of an order equal to a total number of electrodes in the plurality of electrodes.

29. The apparatus of claim 17, wherein the sensing circuitry is configurable to generate, during an integration period, a first composite output signal corresponding to a first voltage reference, a second composite output signal corresponding to a second voltage reference and subtract the second composite output signal from the first composite output signal to remove noise.

30. The apparatus of claim 17, wherein the plurality of outputs of the sensing circuitry are generated by subtracting an output of the second integrator circuit from an output of the first integrator circuit during a plurality of integration periods.

31. The apparatus of claim 25, wherein the demodulation section decodes a self-capacitance measurement from the plurality of outputs of the sensing circuitry based on an inverse of the plurality of values.

32. The apparatus of claim 16, wherein the sensing circuitry is configurable to:
  integrate a first input signal comprising signal contributions from one or more of the plurality of electrodes coupled to an input of an integrator circuit during a first portion of an integration period;
  integrate a second input signal comprising signal contributions from one or more of the plurality of electrodes coupled to the input of the integrator circuit during a second portion of the integration period; and
  generate a composite output signal based on the difference between an output of the integrator circuit during the first portion of the integration period and the output of the integrator circuit during the second portion of the integration period.

* * * * *